UNITED STATES PATENT OFFICE.

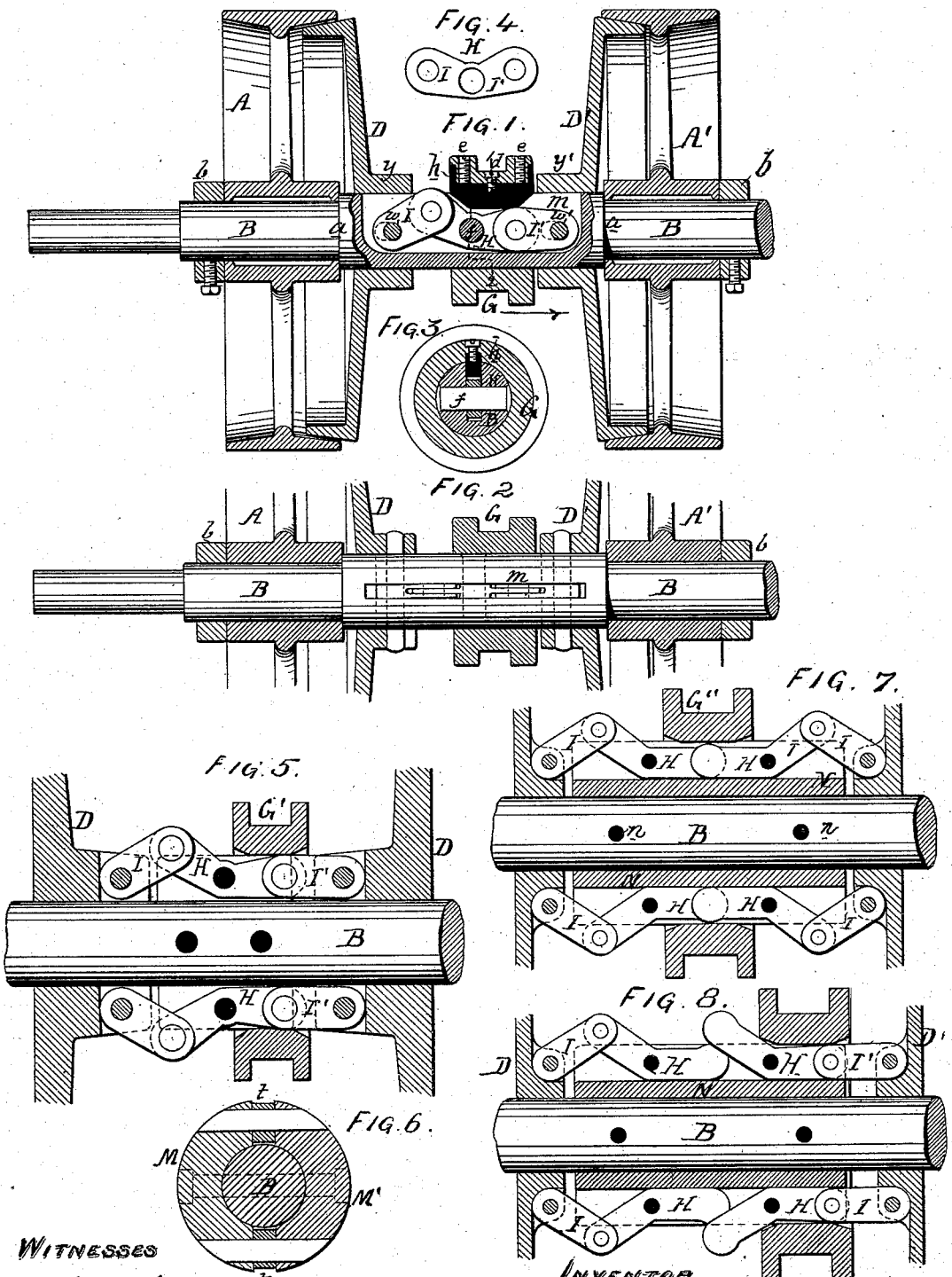

THOMAS W. CAPEN, OF STAMFORD, CONNECTICUT, ASSIGNOR TO THE YALE LOCK MANUFACTURING COMPANY, OF SAME PLACE.

CLUTCH-OPERATING MECHANISM.

SPECIFICATION forming part of Letters Patent No. 229,092, dated June 22, 1880.

Application filed February 6, 1880. Patented in England March 20, 1879.

*To all whom it may concern:*

Be it known that I, THOMAS W. CAPEN, of Stamford, Fairfield county, Connecticut, have invented a new and useful Improvement in Mechanism for Operating Clutches, of which the following is a specification.

The main object of my invention is to make cheap, simple, and effective mechanism for operating friction and other clutches—an object which I attain by combining with the said clutches certain toggle-joint levers and a sleeve which has a direct action on the said levers, as explained hereinafter.

By way of illustration I have shown my invention as applied to friction-clutches of the common conical form.

In the accompanying drawings, Figure 1 is a view showing the clutches and sleeve in section and the shaft partly in section, to illustrate the clutch-operating mechanism; Fig. 2, a plan, partly in section; Fig. 3, a transverse section on the line 1 2; Fig. 4, a detached view of part of Fig. 1; Figs. 5 and 6, views representing a modification of my invention, and Figs. 7 and 8 views showing another modification.

In Figs. 1, 2, and 3, A and A' are two pulleys loose on the shaft B, each pulley being confined longitudinally on the shaft in one direction by a shoulder, $a$, and in the other direction by a collar, $b$. On the middle portion of the shaft are two friction-clutches, D D'—the former adapted to the pulley A and the latter to the pulley A'.

It may be remarked here that my invention has no relation to any peculiarity in the clutches themselves or to the arrangement of the frictional surfaces on which the clutches are brought to bear, my invention being applicable to all frictional or other clutches operated by pressure applied in the axial line of the shaft or parallel therewith.

In the enlarged portion of the shaft, between the two clutches, is formed a longitudinal slot or recess, $m$, into which projects a portion of a sleeve, G, which is arranged to slide on the shaft, and is operated by the usual forked lever, adapted to a groove in the said sleeve.

In the present instance the portion of the sleeve which projects into the slot $m$ is made separate from the sleeve itself, and consists of a piece, $h$, fitted to a recess in the sleeve, as shown in Figs. 1 and 3, and confined thereto by a set-screw, $d$, two screws, $e$ $e$, bearing on the piece and serving to adjust the same to a greater or less depth into the slot $m$ of the shaft, as circumstances, which will be rendered apparent hereinafter, may suggest.

A lever, H, is contained within the slot $m$ of the shaft, and is pivoted to the latter by a pin, $f$, and one arm of this lever is connected by a link, I, to a pin, $w$, which passes through the shaft and through the hub $y$ of the clutch D, the other arm of the lever being similarly connected by a link, I', to a pin, $w'$, which passes through the shaft and through the hub $y'$ of the clutch D'. The holes in the shaft through which the pins $w$ and $w'$ pass are elongated, so that each clutch may have a limited sliding movement on the shaft without being able to turn independently of the same.

It will be noticed, on reference to Fig. 1, that the central portion of the projection $h$ is straight and parallel with the shaft and that the ends are beveled.

In Fig. 1 the sleeve G has been moved in the direction of the arrow so far that one arm of the lever H and the link I' have been depressed into the slot of the shaft, and the clutch D' consequently moved into contact with the frictional surface of the pulley A', while the other arm of the lever and the link I have been partly raised from the slot and the clutch D removed from frictional contact with the pulley A.

As the straight portion of the projection $h$ is bearing on the link I' where the latter is jointed to one arm of the lever H, no effort is required to keep the sleeve in the position shown, and the clutches will therefore retain their relative position without the aid of the mechanism for operating the sleeve, thus avoiding end-thrust and collar-friction upon the shaft. The coupling pressure is self-contained within the shaft and rotating parts.

On moving the sleeve in a direction contrary to that pointed out by the arrow the link I and that arm of the lever H to which the link is connected will be depressed into the slot as the link I' and that arm of the lever attached to the link are being relieved from the control of the projection $h$, and the clutch D will be in frictional contact with the pulley A. When the sleeve has been adjusted to a position midway between the clutches both of the latter will be free from contact with their respective pulleys.

It will be understood that my invention may be applied to a single clutch as well as to the double clutch shown and described.

When it is not advisable to weaken the shaft by slotting it, two segments, M M', may be secured to the said shaft in the manner shown in Figs. 5 and 6, the longitudinal spaces $t\ t$ between the segments being adapted for the reception of the lever and links, the latter being connected directly to the hubs of the clutches, and the levers being pivoted to the segments. In this case the sleeve G' is arranged to slide on the segments and to operate on the exterior of the lever and links in the manner described above.

In the modification shown in Figs. 7 and 8 a hub, N, is secured to the shaft, and this hub is slotted for the reception of two sets of levers and links, which are operated on by the sleeve G'' in a manner which the views will explain without description, the object being to isolate the two clutches from each other and avoid the connected action of the clutches shown in Figs. 1 to 5. In this manner one clutch may be wholly uncoupled before the other one is moved toward its finally-coupled position. More end play or motion in the neutral or uncoupled position is thus given to each clutch, to insure its entire disconnection when the other one is connected and driving.

It will be seen that the same general features and mode of operation are common to all the modifications shown—that is, the operating of a friction-clutch through the medium of toggle-joint levers and by a sleeve acting directly on the exterior of the levers, its operating motion being parallel to their effective thrust.

Among the advantages of my invention may be enumerated, first, compactness, the toggle-lever system being so small diametrically that the operating-sleeve encircles and traverses it; second, absence of projecting parts; third, adaptability to any clutch requiring end-pressure, such as the cone, the forked or ratchet clutch, Weston's disks, &c.; fourth, disconnection by a positive pull instead of merely removing the pressure; and, fifth, the avoidance of all collar-friction or longitudinal displacement of the shaft, owing to the self-contained character of the operating devices.

I claim as my invention—

The combination of a friction clutch or clutches with a toggle-joint lever or levers pivoted directly or indirectly to the clutch-shaft, and connected to the said clutch or clutches, and with a sleeve arranged for acting directly on the said toggle joint or joints, substantially as set forth.

In testimony whereof I have signed my name to this specification in the presence of two subscribing witnesses.

THOS. W. CAPEN.

Witnesses:
THOS. O. WESTON,
W. C. STROBRIDGE, Jr.